US009822952B2

(12) United States Patent
Farmer et al.

(10) Patent No.: US 9,822,952 B2
(45) Date of Patent: Nov. 21, 2017

(54) APPARATUS PROVIDING BEAMFORMING AND ENVIRONMENTAL PROTECTION FOR LED LIGHT SOURCES

(75) Inventors: Todd Farmer, Livermore, CA (US); Keith Scott, Livermore, CA (US)

(73) Assignee: BRIDGELUX INC., Fremont, CA (US)

( * ) Notice: Subject to any disclaimer, the term of this patent is extended or adjusted under 35 U.S.C. 154(b) by 224 days.

(21) Appl. No.: 13/085,665

(22) Filed: Apr. 13, 2011

(65) Prior Publication Data

US 2012/0120663 A1 May 17, 2012

Related U.S. Application Data

(60) Provisional application No. 61/412,752, filed on Nov. 11, 2010.

(51) Int. Cl.
*B60Q 1/00* (2006.01)
*F21V 17/00* (2006.01)
(Continued)

(52) U.S. Cl.
CPC ............ *F21V 17/005* (2013.01); *F21V 29/70* (2015.01); *F21V 31/005* (2013.01); *F21W 2111/02* (2013.01); *F21Y 2115/10* (2016.08)

(58) Field of Classification Search
USPC ....... 362/294, 373, 459, 487, 507, 509, 520, 362/538, 543, 546, 547
See application file for complete search history.

(56) References Cited

U.S. PATENT DOCUMENTS 7,600,890 B2 10/2009 Swantner et al.
2008/0062697 A1* 3/2008 Swantner et al. ............ 362/294
(Continued)

FOREIGN PATENT DOCUMENTS

JP 2008192609 8/2008
TW M337864 U 8/2008
TW M364818 U 9/2009

OTHER PUBLICATIONS

International Preliminary Report on Patentability dated May 14, 2013 and Written Opinion dated Mar. 12, 2012 regarding PCT/US2011/060071.

(Continued)

*Primary Examiner* — Andrew Coughlin
*Assistant Examiner* — Meghan Ulanday
(74) *Attorney, Agent, or Firm* — Arent Fox LLP

(57) ABSTRACT

Apparatus providing beamforming and environmental protection for LED light sources. A lens apparatus is provided to protect an LED mounted on a substrate. The lens apparatus includes an alignment feature configured to align the LED to a selected position and a focusing region configured to form a selected beam pattern from light emitted from the LED when located at the selected position. The lens apparatus also includes a compression surface configured to compress the substrate to a heat sink to facilitate heat dissipation from the LED and a fastening feature configured to fasten the lens apparatus to the heat sink to provide an environmentally protective seal, so that when the lens apparatus is fastened to the heat sink the alignment feature aligns the LED to the selected position, the compression surface compresses the substrate to the heat sink, and the protective seal protects the LED from environmental conditions.

26 Claims, 3 Drawing Sheets

(51) Int. Cl.

| | |
|---|---|
| ***F21V 31/00*** | (2006.01) |
| ***F21V 29/70*** | (2015.01) |
| *F21W 111/02* | (2006.01) |
| *F21Y 115/10* | (2016.01) |

(56) References Cited

U.S. PATENT DOCUMENTS

| | | | | |
|---|---|---|---|---|
| 2008/0273325 | A1 | 11/2008 | Wilcox et al. | |
| 2008/0278941 | A1* | 11/2008 | Logan et al. | 362/234 |
| 2009/0180281 | A1 | 7/2009 | Ahland, III et al. | |
| 2009/0207617 | A1* | 8/2009 | Merchant et al. | 362/294 |
| 2009/0237942 | A1 | 9/2009 | Lam et al. | |
| 2010/0072416 | A1 | 3/2010 | Fujioka et al. | |
| 2012/0075833 | A1 | 3/2012 | Le | |

OTHER PUBLICATIONS

International Search Report dated Mar. 12, 2012 regarding PCT/US2011/060071.
Japan Office Action dated Feb. 7, 2013 regarding Japan Application No. JP2011-540737.
Taiwan Office Action and Search Report dated May 22, 2014 regarding Taiwanese Patent Application No. 100141187.
Decision of Rejection dated Jan. 27, 2015 regarding Taiwan Application No. TW100141187.
U.S. Appl. No. 61/412,752, filed Nov. 11, 2011.
Third Office Action dated Apr. 22, 2016 regarding Taiwan Application No. TW100141187, and English translation.

* cited by examiner

APPARATUS PROVIDING BEAMFORMING AND ENVIRONMENTAL PROTECTION FOR LED LIGHT SOURCES

CLAIM OF PRIORITY UNDER 35 U.S.C. §119

This patent application claims the benefit of priority from U.S. Provisional Patent Application No. 61/412,752 entitled "Apparatus Providing Beamforming and Environmental Protection for LED Light Sources" filed on Nov. 11, 2010 and assigned to the assignee hereof and hereby expressly incorporated by reference herein.

BACKGROUND

Field

The present application relates generally to light emitting diodes, and more particularly, to apparatus providing beamforming and environmental protection for light emitting diode (LED) light sources.

Background

A light emitting diode comprises a semiconductor material impregnated, or doped, with impurities. These impurities add "electrons" and "holes" to the semiconductor, which can move in the material relatively freely. Depending on the kind of impurity, a doped region of the semiconductor can have predominantly electrons or holes, and is referred to as an n-type or p-type semiconductor region, respectively.

In LED applications, an LED semiconductor chip includes an n-type semiconductor region and a p-type semiconductor region. A reverse electric field is created at the junction between the two regions, which causes the electrons and holes to move away from the junction to form an active region. When a forward voltage sufficient to overcome the reverse electric field is applied across the p-n junction, electrons and holes are forced into the active region and combine. When electrons combine with holes, they fall to lower energy levels and release energy in the form of light. The ability of LED semiconductors to emit light has allowed these semiconductors to be used in a variety of lighting devices. For example, LED semiconductors may be used in general lighting devices for interior applications or in street lighting for exterior applications.

When using LED semiconductors in lighting devices for exterior applications, it is generally necessary to provide environmental protection to prevent damage from exposure to moisture or other environmental conditions. For example, exterior LED lighting is typically designed to meet industry standard Ingress Protection (IP) ratings that specify various levels of environmental protection. For example, an IP rating normally has two (or three) numbers that specify a level of protection from solid objects, liquids, and/or mechanical impacts. Typically, LED lighting devices for exterior use are designed to satisfy IP-65/66/67 ratings.

Both interior and exterior LED lighting devices may utilize beamforming lenses to produce light having a particular beam pattern. For example, roadway lights are typically designed to meet Illuminating Engineering Society of North America (IESNA) or International Commission on Illumination (CIE) standards.

These standards specify illumination patterns for pole mounted roadway lights. To meet these requirements, an exterior LED lighting device may utilize one or more optical lenses and/or reflectors to distribute the light emitted from the LED semiconductor to produce light having a desired illumination pattern.

The application of LED semiconductors in lighting devices may also require the use of additional components to provide alignment or heat dissipation. For example, the precise alignment of the LED semiconductor may be needed to facilitate beamforming. Furthermore, high powered LED semiconductors used in exterior lighting applications often generate heat which needs to be dissipated. As a result, additional heat dissipating components may also be used in these devices.

Conventional LED devices for exterior use typically have separate components, parts, and/or assemblies which are combined to provide the beamforming, environmental protection, alignment, and heat dissipation functions described above. However, such devices typically comprise a large number of parts and/or mounting components. Unfortunately, this may result in LED devices that may be expensive, complicated to assemble/disassemble, and may be difficult to maintain and/or repair.

Accordingly, what is needed is a simple and efficient way to meet the beamforming and environmental protection requirements for exterior LED light sources and which overcomes the problems of excessive components, expense, and complicated assembly associated with conventional LED devices.

SUMMARY

In various implementations, an apparatus providing beamforming and environmental protection for LED light sources is provided. In one implementation, the apparatus comprises a beamforming lens that includes an alignment feature to align an LED, a compression surface to compress the LED to a heat sink, and an environmental protection feature to provide environmental protection. All these features are incorporated into an easy to mount apparatus requiring few mounting components. Thus, the apparatus provides a simple and efficient way to meet the beamforming and environmental protection requirements for an LED light source without the expense and/or excessive mounting components utilized in conventional light sources.

In an implementation, a lens apparatus is provided to protect an LED mounted on a substrate. The lens apparatus comprises an alignment feature configured to align the LED to a selected position and a focusing region configured to form a selected beam pattern from light emitted from the LED when located at the selected position. The lens apparatus also comprises a compression surface configured to compress the substrate to a heat sink to facilitate heat dissipation from the LED and a fastening feature configured to fasten the lens apparatus to the heat sink to provide an environmentally protective seal, so that when the lens apparatus is fastened to the heat sink the alignment feature aligns the LED to the selected position, the compression surface compresses the substrate to the heat sink, and the protective seal protects the LED from environmental conditions.

In an implementation, a lens apparatus is provided to protect an LED mounted on a substrate. The lens apparatus comprises means for aligning the LED to a selected position and means for forming a selected beam pattern from light emitted from the LED when located at the selected position. The lens apparatus also comprises means for compressing the substrate to a heat sink to facilitate heat dissipation from the LED and means for fastening the lens apparatus to the heat sink to provide an environmentally protective seal, so that when the lens apparatus is fastened to the heat sink the means for aligning aligns the LED to the selected position, the means for compressing compresses the substrate to the heat sink, and the protective seal protects the LED from environmental conditions.

In an implementation, an environmentally protective cover is provided to protect an LED from environmental conditions. The cover comprises an alignment feature configured to align the LED to a selected position, an optics region configured to form a selected beam pattern from light emitted from the LED when located at the selected position, and an environmentally protective seal that seals the cover to a heat sink, so that wherein when the cover is sealed to the heat sink the alignment feature aligns the LED to the selected position and the protective seal protects the LED from environmental conditions.

It is understood that other aspects of the present invention will become readily apparent to those skilled in the art from the following detailed description. As will be realized, the present invention includes other and different aspects and its several details are capable of modification in various other respects, all without departing from the spirit and scope of the present invention. Accordingly, the Drawings and the Description are to be regarded as illustrative in nature and not as restrictive.

BRIEF DESCRIPTION OF THE DRAWINGS

The foregoing aspects described herein will become more readily apparent by reference to the following Description when taken in conjunction with the accompanying drawings wherein.

DESCRIPTION

Figure 1:
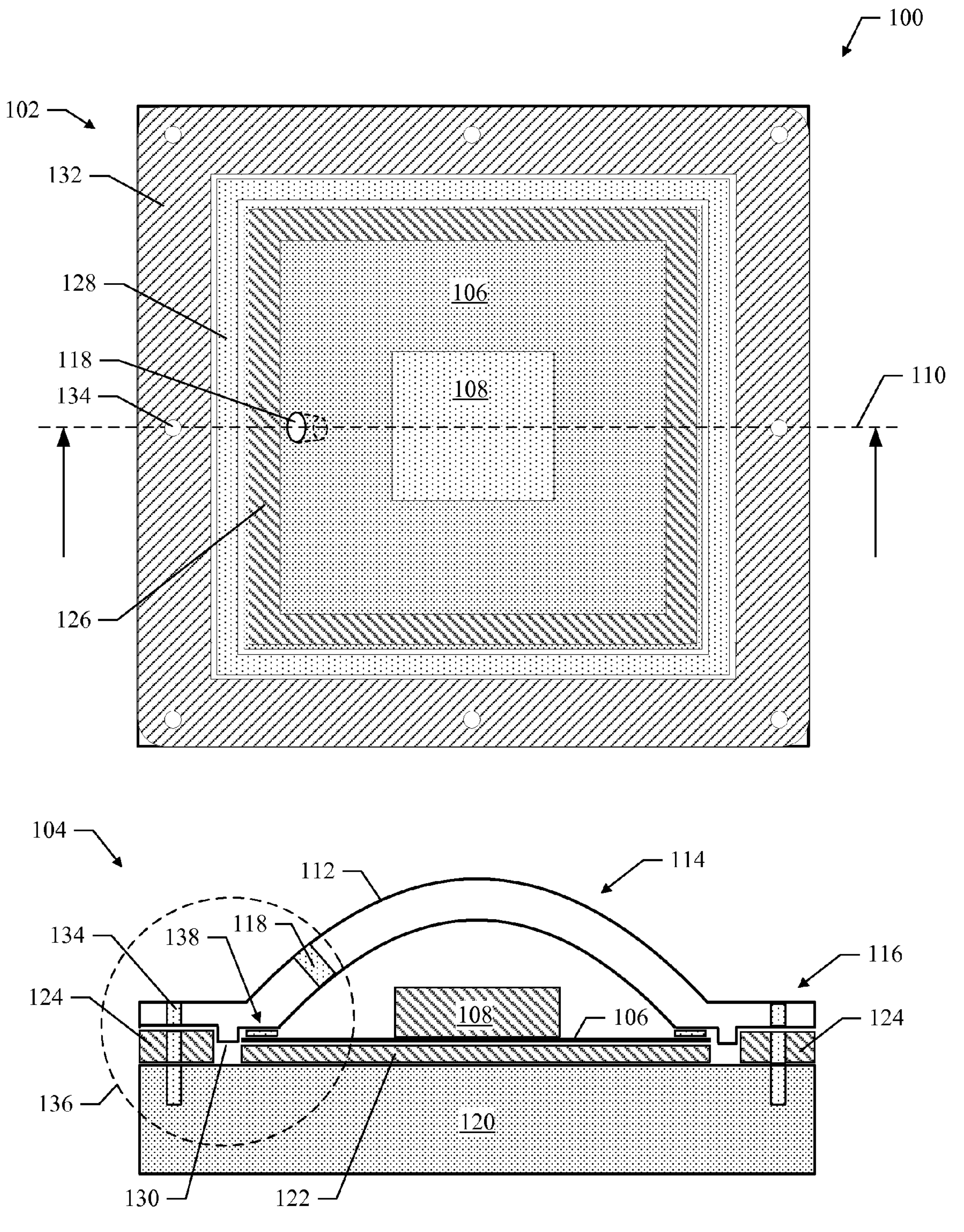
FIG. 1 shows top and cross-sectional views of an exemplary apparatus for providing beamforming and environmental protection for LED light sources.

The present invention is described more fully hereinafter with reference to the accompanying Drawings, in which various aspects of the present invention are shown. This invention may, however, be embodied in many different forms and should not be construed as limited to the various aspects presented throughout this disclosure. Rather, these aspects are provided so that this disclosure will be complete enough to provide a thorough understanding of the present invention to those skilled in the art. The various aspects of the present invention illustrated in the drawings may not be drawn to scale. Accordingly, the dimensions of the various features may be expanded or reduced for clarity. In addition, some of the drawings may be simplified for clarity. Thus, the drawings may not depict all of the components of a given apparatus (e.g., device) or method.

Various aspects of the present invention will be described herein with reference to drawings that are schematic illustrations of idealized configurations of the present invention. As such, variations from the shapes of the illustrations as a result, for example, manufacturing techniques and/or tolerances, are to be expected. Thus, the various aspects of the present invention presented throughout this disclosure should not be construed as limited to the particular shapes of elements (e.g., regions, layers, sections, substrates, etc.) illustrated and described herein but are to include deviations in shapes that result, for example, from manufacturing. By way of example, an element illustrated or described as a rectangle may have rounded or curved features and/or a gradient concentration at its edges rather than a discrete change from one element to another. Thus, the elements illustrated in the drawings are schematic in nature and their shapes may not be intended to illustrate the precise shape of an element and are not intended to limit the scope of the present invention.

It will be understood that when an element such as a region, layer, section, substrate, or the like, is referred to as being "on" another element, it can be directly on the other element or intervening elements may also be present. In contrast, when an element is referred to as being "directly on" another element, there are no intervening elements present. It will be further understood that when an element is referred to as being "formed" on another element, it can be grown, deposited, etched, attached, connected, coupled, or otherwise prepared or fabricated on the other element or an intervening element.

Furthermore, relative terms, such as "lower" or "bottom" and "upper" or "top," may be used herein to describe one element's relationship to another element as illustrated in the drawings. It will be understood that relative terms are intended to encompass different orientations of an apparatus in addition to the orientation depicted in the Drawings. By way of example, if an apparatus in the Drawings is turned over, elements described as being on the "lower" side of other elements would then be oriented on the "upper" sides of the other elements. The term "lower", can therefore, encompass both an orientation of "lower" and "upper," depending of the particular orientation of the apparatus. Similarly, if an apparatus in the drawing is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items It will be understood that although the terms "first" and "second" may be used herein to describe various regions, layers and/or sections, these regions, layers and/or sections should not be limited by these terms. These terms are only used to distinguish one region, layer or section from another region, layer or section. Thus, a first region, layer or section discussed below could be termed a second region, layer or section, and similarly, a second region, layer or section may be termed a first region, layer or section without departing from the teachings of the present invention.

FIG. 1 shows a top view 102 and a cross-sectional view 104 of an exemplary apparatus 100 for providing beamforming and environmental protection for LED light sources. For example, the apparatus 100 is suitable for use in an external lighting device, such as a roadway light. In one implementation, the apparatus 100 is dimensioned to be 5 inches wide by 5 inches long by 2 inches tall.

Referring to the top view 102, a substrate 106 is shown that comprises a LED semiconductor 108 mounted thereon. The substrate 106 comprises ceramic or other suitable material. The LED 108 comprises an LED semiconductor device suitable for external lighting applications. It should be noted that although only one LED semiconductor is shown in FIG. 1, the substrate 106 may be configured to support any number of LED semiconductors.

The cross-sectional view 104 shows the apparatus 100 from a perspective taken at cross-section indicator 110. As illustrated in the view 104, the apparatus 100 comprises a lens 112. The lens 112 may also be referred to as an environmentally protective cover, cap, or LED protector. The lens 112 may be comprised of one or more materials, namely; acrylic, glass, plastic, crystal, or a polymer. In one implementation, the lens 112 comprises a clear acrylic which can be seen in the cross-sectional view 104 but is not easily detected in the top view 102. The lens 112 comprises a focusing portion or optics region, shown generally at 114, and a mounting portion, shown generally at 116.

The focusing portion 114 of the lens 112 operates to form a particular beam pattern from the light emitted from the LED 108. For example, the focusing portion 114 comprises any suitable optics or optical material that functions to redistribute incoming light from the LED 108 to produce light having a desired pattern. For example, the beam pattern may be any IESNA or CIE type beam pattern. In another implementation, the beam pattern is any user defined beam pattern such as a round, non-round, or elliptical pattern or a pattern having any other geometric or user defined shape, for instance, stars, triangles or half circles typically used in entertainment lighting. However, in other implementations, the lens 112 is transparent or translucent and the resulting beam pattern replicates the light emission pattern of light emitted from the LED 108. Another feature of the lens 112 is conduit 118 which provides a path that can be used to route electrical connections to the LED 108 to provide power, ground, and/or other electrical signals. Also shown in the view 104 are heat sink 120, thermal interface material 122 and gasket 124.

Referring again to the top view 102, several regions are illustrated. For example, a compression region 126 is shown. The compression region 126 represents a region where the lens 112 comes into contact with the substrate 106 and operates to compress the substrate 106 onto the heat sink 120.

Another region shown in the top view 102 is an alignment region 128. The alignment region 128 represents a region comprising a flange 130 (shown more clearly in the view 104) which operates to capture the substrate 106 into a particular location or position. The flange 130 is described in more detail in another section of this document.

Another region shown in the top view 102 is an environmental protection region 132. The environmental protection region 132 represents a region where the gasket 124, O-ring or other material is captured between the lens 112 and the heat sink 120. This operates to protect the LED 108 from environmental conditions, such as exposure to moisture or liquids. In this example, a fastening feature comprising several mounting holes 134 are provided to allow the lens 112 to be fastened to the heat sink 120.

Referring again to cross-sectional view 104, a region 136 is shown. The region 136 includes the compression region 126, the alignment region 128, and the environment protection region 132. When the lens 112 is fastened to the heat sink 120, a compression surface 138 of the compression region 126 compresses the substrate 106 and thermal interface material 122 to the heat sink 120, while the flange 130 aligns the substrate 106 (and LED 108) into the desired position and the gasket 124 provides environmental protection to protect the LED 108 from environmental conditions. The features of the lens 112 contained in the region 136 are described in more detail in another section of this document.

As a result, the lens 112 provides a simple and efficient way to meet the beamforming and environmental protection requirements for an exterior LED light source without the expense and complicated mounting components utilized in conventional light sources. To summarize, the lens 112 operates to provide at least the following four functions.

1. Beamforming—The focusing region 114 allows any beam pattern, such as IESNA (types 1-5) beam patterns, to be produced from light emitted from a light source comprising one or more semiconductor devices.
2. Environmental Protection—Region 132 and gasket 124 provide environmental protection, such as IP 65/66/67/68 ratings, to protect the semiconductor light source from environmental conditions.
3. Simplified Assembly—The alignment region 128 and the compression region 126 enable a fastening feature (comprising mount holes 134) to be used to fasten the lens to a heat sink and thereby assure environmental protection, alignment of the semiconductor light source, and compression of the semiconductor light source to the heat sink for heat dissipation.
4. Electrical Connection—The conduit 118 provides an environmentally protected wiring conduit to allow power, ground and/or signal conductors to be routed to the semiconductor light source.

Figure 2:
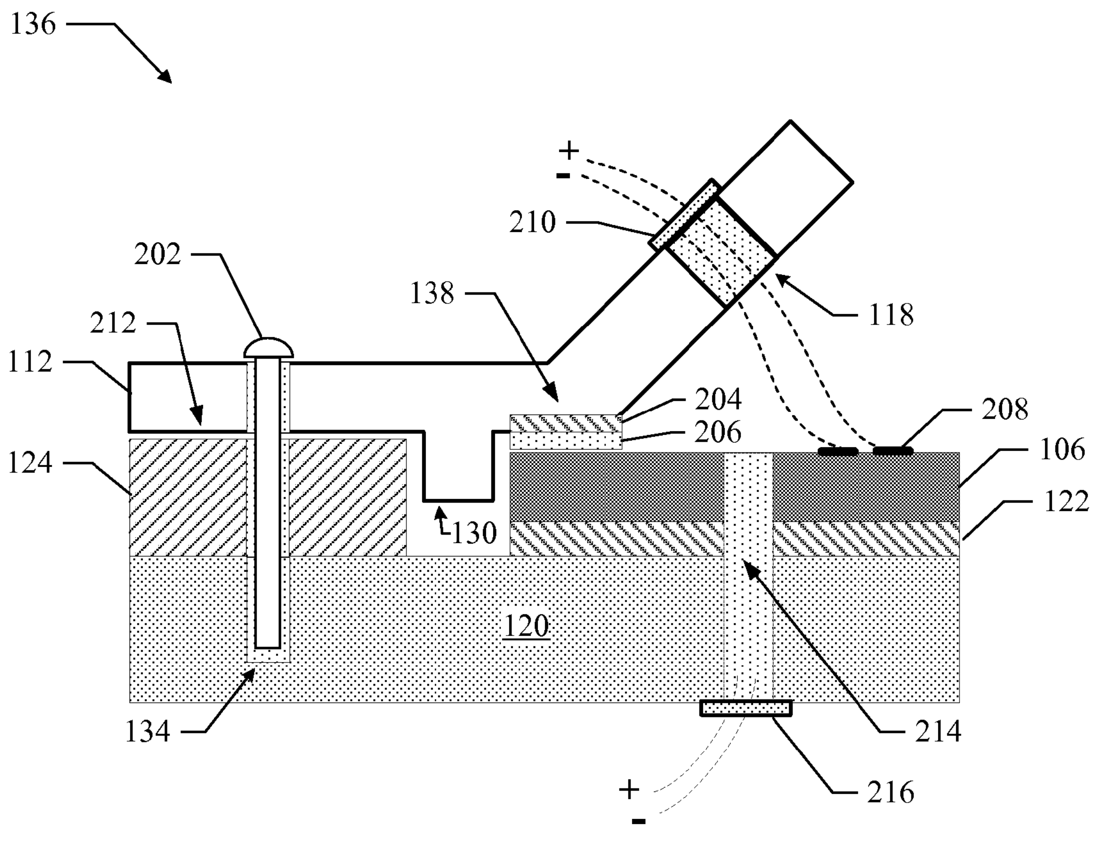
FIG. 2 shows a detailed view of the apparatus illustrated in FIG. 1.

FIG. 2 shows a detailed view of the region 136 of the apparatus 100 shown in FIG. 1. The detailed view 136 illustrates the arrangement of the lens 112, heat sink 120, and substrate 106. The detailed view 136 also illustrates the features of the lens 112 which provide beamforming, environmental protection, simplified assembly, and electrical connections.

When assembled, the lens 112 is fastened to the heat sink 120 using the fastening feature. For example, the fastening feature comprises a fastener, such as a screw, pin, or clip 202 that is installed in the mounting hole 134. In another implementation, the fastening feature comprises a latch or a snap-closure, which utilize the mounting holes 134 to fasten the lens 112 to the heat sink 120. When fastened together the lens 112 and the heat sink 120 compress the gasket 124 to form an environmentally protective seal to protect the semiconductor light source from exposure to moisture or other harmful environmental conditions. For example, the lens 112 comprises a protection surface 212 that compresses the gasket 124 or O-ring to the heat sink 120. The gasket 124 comprises an elastomer designed to provide a moisture barrier when compressed.

As illustrated, the lens 112 comprises the flange 130 which operates to surround and capture the substrate 106 into a particular location or position with respect to the lens 112 thereby providing a mechanism for aligning the location of the semiconductor light source to achieve the desired beam pattern. For example, the LED 108 is aligned into a selected position by aligning the substrate 106. When the LED 108 is aligned, its emitted light will strike the focusing portion 114 of the lens 112 to produce the desired beam pattern. In another implementation, the flange 130 may not completely surround the substrate 106 but may form several smaller flanges or teeth that are spaced around the substrate and operate to capture the substrate. In another implementation, the flange 130 is implemented as one or more alignment pins that align with alignment holes in the substrate 106 thereby aligning the substrate 106 when the alignment pins penetrate the substrate alignment holes as the lens 112 is fastened to the heat sink 120.

Therefore, although the alignment of the substrate 106 and ultimately the semiconductor light source is performed by the flange 130, the alignment of the substrate 106 may also be achieved using alignment teeth, pins or other alignment mechanism that performs alignment of the substrate 106 when the lens 112 is fastened to the heat sink 120.

The compression surface 138 optionally comprises a thermal isolation material 204 and a rigid layer 206. When the lens 112 is fastened to the heat sink 120, the rigid layer 206 and the isolation material 204 compress against the substrate 106 to compress the substrate 106 and thermal interface material 122 against the heat sink 120. This facilitates dissipation of heat generated by the semiconductor light source into the heat sink 120. The rigid layer 206 comprises metal or other material that can withstand compression onto the substrate 106 without damage. The rigid layer 206 contacts the substrate 106 along the substrate's perimeter. In one implementation, the rigid layer 206 contacts the substrate 106 along its entire perimeter. In another implementation, the rigid layer 206 contacts only selected regions of the substrate 106 located along its perimeter. The rigid layer 206 operates to compress the substrate 106 to the heat sink 120 and so it is possible that the rigid layer 206 have any desired sized or shaped regions to accomplish this function.

Between the lens 112 and the rigid layer 206 is the thermal isolation material 204. The thermal isolation material 204 comprises any material that can protect the lens 112 from heat that may be experienced by the rigid layer 206. For example, as the rigid layer 206 compresses the substrate 106 to the heat sink 120, heat will flow from the substrate 106 to the rigid layer 206. If the rigid layer 206 is composed of metal then the heat transfer may cause the temperature of the metal to reach a level that may damage the lens 112. The thermal isolation material 204 operates to protect the lens 112 from any heat that builds up in the rigid layer 206.

To facilitate the transfer of heat, the thermal transfer material 122 is provided between the substrate 106 and the heat sink 120. The thermal transfer material 122 may comprise any suitable material designed for this purpose.

The lens 112 also comprises the conduit 118, which provides a path for electrical connections to the semiconductor light source. For example, power (+) and ground (−) wires can pass through the conduit 118 and attach to the substrate 106 at conductive pads 208 to provide power to the semiconductor light source. In one implementation, an environmentally protective connector 210 is mounted to the conduit 118 and operates to prevent moisture or gas from penetrating the region inside the lens 112. The connector 210 may be any connector suitable for this purpose.

In an alternative implementation, a conduit 212 through the heat sink 120 is provided. The conduit 212 allows power (+) and ground (−) wires to pass to the substrate 106 to provide power to the semiconductor light source. An environmentally protective connector 216 is also provided.

Figure 3:
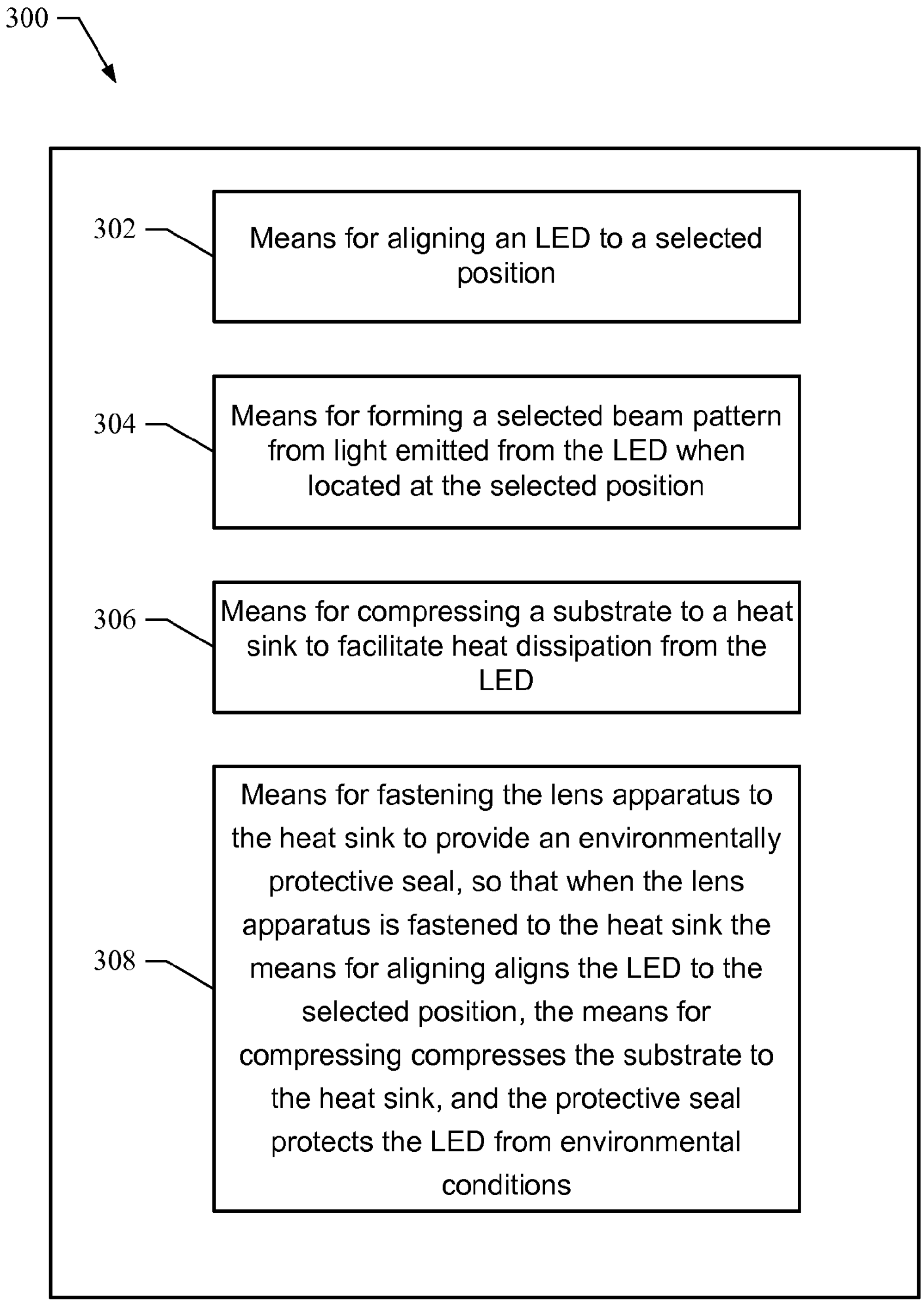
FIG. 3 shows an exemplary apparatus for providing beamforming and environmental protection for LED light sources.

FIG. 3 shows an exemplary apparatus 300 for providing beamforming and environmental protection for LED light sources. For example, the apparatus 300 may be used as the lens apparatus 112 shown in FIG. 1.

The apparatus 300 comprises means (302) for aligning an LED to a selected position. For example, in one implementation, means 302 comprises the flange 130.

The apparatus 300 also comprises means (304) for forming a selected beam pattern from light emitted from the LED when located at the selected position. For example, in one implementation, the means 304 comprises the focusing portion 114.

The apparatus 300 also comprises means (306) for compressing a substrate to a heat sink to facilitate heat dissipation from the LED. For example, in one implementation, the means 306 comprises the compression surface 138.

The apparatus 300 also comprises means (308) for fastening the lens apparatus to the heat sink to provide an environmentally protective seal, so that when the lens apparatus is fastened to the heat sink the means for aligning aligns the LED to the selected position, the means for compressing compresses the substrate to the heat sink, and the protective seal protects the LED from environmental conditions. For example, in one implementation, the means 308 comprises the protection surface 212 and gasket 124.

Thus, the apparatus 300 operates to provide beamforming and environmental protection for LED light sources.

The various aspects of this disclosure are provided to enable one of ordinary skill in the art to practice the present invention. Various modifications to aspects presented throughout this disclosure will be readily apparent to those skilled in the art, and the concepts disclosed herein may be extended to other applications. Thus, the claims are not intended to be limited to the various aspects of this disclosure, but are to be accorded the full scope consistent with the language of the claims. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

Accordingly, while aspects of an LED apparatus for beamforming and environmental protection for LED lighting devices have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A lens apparatus to protect a light emitting diode (LED) mounted on a substrate, the lens apparatus comprising:

an alignment feature formed on the lens apparatus and configured to capture the substrate to align the LED to a selected position relative to the lens apparatus;

a focusing region configured to form a selected beam pattern from light emitted from the LED when located at the selected position;

a compression surface on the lens apparatus and configured to compress the substrate to a heat sink to facilitate heat dissipation from the LED; and a fastening feature configured to fasten the lens apparatus to the heat sink to provide an environmentally protective seal, so that when the lens apparatus is fastened to the heat sink the alignment feature captures the substrate to align the LED to the selected position relative to the lens apparatus, the compression surface compresses the substrate to the heat sink, and the protective seal protects the LED from environmental conditions.

2. The lens apparatus of claim 1, wherein the selected beam pattern is selected from a set of beam patterns used for roadway illumination.

3. The lens apparatus of claim 1, wherein the selected beam pattern replicates a light emission pattern of light emitted from the LED.

4. The lens apparatus of claim 1, wherein the selected beam pattern comprises any user defined beam pattern.

5. The lens apparatus of claim 1, wherein the alignment feature comprises at least one of a flange, a plurality of flange portions, and one or more alignment pins that are configured to capture the substrate to align the LED in the selected position.

6. The lens apparatus of claim 1, wherein the compression surface comprises a thermal isolation layer coupled to the lens apparatus.

7. The lens apparatus of claim 1, wherein the fastening feature comprises at least one mounting hole to receive at least one of a screw, pin, and clip to fasten the lens apparatus to the heat sink.

8. The lens apparatus of claim 1, further comprising thermal transfer material between the substrate and the heat sink.

9. The lens apparatus of claim 1, wherein the lens apparatus comprises at least one material selected from a set of materials comprising acrylic, plastic, glass, crystal and polymer materials.

10. A lens apparatus to protect a light emitting diode (LED) mounted on a substrate, the lens apparatus comprising:

an alignment feature configured to capture the substrate to align the LED to a selected position;

a focusing region configured to form a selected beam pattern from light emitted from the LED when located at the selected position;

a compression surface configured to compress the substrate to a heat sink to facilitate heat dissipation from the LED; and a fastening feature configured to fasten the lens apparatus to the heat sink to provide an environmentally protective seal, so that when the lens apparatus is fastened to the heat sink the alignment feature captures the substrate to align the LED to the selected position, the compression surface compresses the substrate to the heat sink, and the protective seal protects the LED from environmental conditions, wherein the compression surface comprises a rigid layer coupled between a thermal isolation layer and the substrate.

11. The lens apparatus of claim 10, wherein the compression surface comprises a thermal isolation layer coupled to the lens apparatus.

12. A lens apparatus to protect a light emitting diode (LED) mounted on a substrate, the lens apparatus comprising:

an alignment feature configured to capture the substrate to align the LED to a selected position;

a focusing region configured to form a selected beam pattern from light emitted from the LED when located at the selected position;

a compression surface configured to compress the substrate to a heat sink to facilitate heat dissipation from the LED; and a fastening feature configured to fasten the lens apparatus to the heat sink to provide an environmentally protective seal, so that when the lens apparatus is fastened to the heat sink the alignment feature captures the substrate to align the LED to the selected position, the compression surface compresses the substrate to the heat sink, and the protective seal protects the LED from environmental conditions, wherein the fastening feature comprises at least one of a latch and a snap closure.

13. A lens apparatus to protect a light emitting diode (LED) mounted on a substrate, the lens apparatus comprising:

an alignment feature configured to capture the substrate to align the LED to a selected position;

a focusing region configured to form a selected beam pattern from light emitted from the LED when located at the selected position;

a compression surface configured to compress the substrate to a heat sink to facilitate heat dissipation from the LED; and a fastening feature configured to fasten the lens apparatus to the heat sink to provide an environmentally protective seal, so that when the lens apparatus is fastened to the heat sink the alignment feature captures the substrate to align the LED to the selected position, the compression surface compresses the substrate to the heat sink, and the protective seal protects the LED from environmental conditions, wherein the fastening feature comprises a protection surface configured to compress at least one of a gasket and an O-ring between the lens apparatus and the heat sink.

14. A lens apparatus to protect a light emitting diode (LED) mounted on a substrate, the lens apparatus comprising:

an alignment feature configured to capture the substrate to align the LED to a selected position;

a focusing region configured to form a selected beam pattern from light emitted from the LED when located at the selected position;

a compression surface configured to compress the substrate to a heat sink to facilitate heat dissipation from the LED; and a fastening feature configured to fasten the lens apparatus to the heat sink to provide an environmentally protective seal, so that when the lens apparatus is fastened to the heat sink the alignment feature captures the substrate to align the LED to the selected position, the compression surface compresses the substrate to the heat sink, and the protective seal protects the LED from environmental conditions, wherein the lens apparatus comprises a conduit for routing at least one of power, ground, and signal connections to the LED.

15. The lens apparatus of claim 14, wherein the conduit comprises an environmentally protective connector to protect the LED from environmental conditions.

16. The lens apparatus of claim 14, wherein the selected beam pattern is selected from a set of beam patterns used for roadway illumination.

17. The lens apparatus of claim 14, wherein the selected beam pattern replicates a light emission pattern of light emitted from the LED.

18. The lens apparatus of claim 14, wherein the selected beam pattern comprises any user defined beam pattern.

19. The lens apparatus of claim 14, wherein the alignment feature comprises at least one of a flange, a plurality of flange portions, and one or more alignment pins that are configured to capture the substrate to align the LED in the selected position.

20. The lens apparatus of claim 14, wherein the compression surface comprises a thermal isolation layer coupled to the lens apparatus.

21. A lens apparatus to protect a light emitting diode (LED) mounted on a substrate, the lens apparatus comprising:

means, formed on the lens apparatus, for capturing the substrate to align the LED to a selected position relative to the lens apparatus;

means for forming a selected beam pattern from light emitted from the LED when located at the selected position;

means, on the lens apparatus, for compressing the substrate to a heat sink to facilitate heat dissipation from the LED; and means for fastening the lens apparatus to the heat sink to provide an environmentally protective seal, so that when the lens apparatus is fastened to the heat sink the means for aligning captures the substrate to align the LED to the selected position relative to the lens apparatus, the means for compressing compresses the substrate to the heat sink, and the protective seal protects the LED from environmental conditions.

22. The lens apparatus of claim 21, wherein said means for capturing comprises at least one of a flange, a plurality of flange portions, and one or more alignment pins that are configured to capture the substrate to align the LED in the selected position.

23. A lens apparatus to protect a light emitting diode (LED) mounted on a substrate, the lens apparatus comprising:

means for capturing the substrate to align the LED to a selected position;

means for forming a selected beam pattern from light emitted from the LED when located at the selected position;

means for compressing the substrate to a heat sink to facilitate heat dissipation from the LED; and means for fastening the lens apparatus to the heat sink to provide an environmentally protective seal, so that when the lens apparatus is fastened to the heat sink the means for aligning captures the substrate to align the LED to the selected position, the means for compressing compresses the substrate to the heat sink, and the protective seal protects the LED from environmental conditions, wherein the means for protecting comprises means for compressing at least one of a gasket and an O-ring between the lens apparatus and a heat sink.

24. An environmentally protective cover to protect a light emitting diode (LED) mounted on a substrate from environmental conditions, the cover comprising:

an alignment feature formed on the cover and configured to capture the substrate to align the LED to a selected position relative to the cover;

an optics region configured to form a selected beam pattern from light emitted from the LED when located at the selected position;

an environmentally protective seal that seals the cover to a heat sink, so that when the cover is sealed to the heat sink the alignment feature captures the substrate to align the LED to the selected position relative to the cover and the protective seal protects the LED from environmental conditions; and a compression surface on the cover to compress the LED to the heat sink, so that when the cover is sealed to the heat sink the compression surface compresses the LED to the heat sink to facilitate heat dissipation from the LED.

25. The cover of claim 24, wherein the alignment feature comprises at least one of a flange, a plurality of flange portions, and one or more alignment pins that are configured to align the LED in the selected position.

26. An environmentally protective cover to protect a light emitting diode (LED) mounted on a substrate from environmental conditions, the cover comprising:

an alignment feature configured to capture the substrate to align the LED to a selected position;

an optics region configured to form a selected beam pattern from light emitted from the LED when located at the selected position; and an environmentally protective seal that seals the cover to a heat sink, so that when the cover is sealed to the heat sink the alignment feature captures the substrate to align the LED to the selected position and the protective seal protects the LED from environmental conditions, wherein the environmentally protective seal comprises a protection surface configured to compress at least one of a gasket and an O-ring between the cover and a heat sink.

* * * * *